United States Patent
Hald et al.

(10) Patent No.: US 11,209,287 B2
(45) Date of Patent: *Dec. 28, 2021

(54) SMART METERING DEVICE PROVIDING ADAPTIVE SERVICE LEVEL

(71) Applicant: Kamstrup A/S, Skanderborg (DK)

(72) Inventors: Flemming Hald, Hadsten (DK); Johnny Dørken Christiansen, Galten (DK); Karsten Kobæk Bidstrup, Højbjerg (DK)

(73) Assignee: Kamstrup A/S, Skanderborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,015

(22) Filed: Jan. 25, 2021

(65) Prior Publication Data

US 2021/0148729 A1    May 20, 2021

Related U.S. Application Data

(63) Continuation of application No. 16/037,076, filed on Jul. 17, 2018, now Pat. No. 10,935,394.

(30) Foreign Application Priority Data

Jul. 18, 2017 (EP) ..................... 17181855

(51) Int. Cl.
*G01D 4/00* (2006.01)
*E03B 7/07* (2006.01)
(Continued)

(52) U.S. Cl.
CPC ............. *G01D 4/006* (2013.01); *E03B 7/071* (2013.01); *G01D 4/008* (2013.01); *G06Q 50/06* (2013.01); *H04W 74/085* (2013.01)

(58) Field of Classification Search
CPC ........ G01D 4/006; G01D 4/008; E03B 7/071; G06Q 50/06; H04W 74/085
See application file for complete search history.

(56) References Cited

U.S. PATENT DOCUMENTS

| | | | |
|---|---|---|---|
| 7,920,983 B1 * | 4/2011 | Peleg | G01M 3/2807 |
| | | | 702/100 |
| 2006/0255965 A1 * | 11/2006 | Nagy | G01D 4/002 |
| | | | 340/870.02 |

(Continued)

FOREIGN PATENT DOCUMENTS

| | | |
|---|---|---|
| CN | 104049571 | 9/2014 |
| EP | 2107341 | 10/2009 |

(Continued)

OTHER PUBLICATIONS

Extended European Search Report dated Jan. 24, 2018 for Application No. 17181855.2.

(Continued)

*Primary Examiner* — Amine Benlagsir
(74) *Attorney, Agent, or Firm* — Renner, Otto, Boisselle & Sklar, LLP (57) ABSTRACT

A smart metering device being part of an advanced metering infrastructure is provided. The smart metering device might comprise one or more sub devices such as: metering devices, actuator devices, sensor devices etc. The smart metering device includes a valve arranged to limit the delivery of a utility to the consumer. Moreover the smart metering devices includes a communication device including a transmitter and a receiver for wireless communication with a collector, utilizing a listen after talk mechanism to perform a two-way communication to the head end system through a collector. The presented invention is especially beneficial for battery supplied smart metering devices. The advanced metering infrastructure will provide a given service level for (Continued)

communication between the meter and the head end system. The service level will be changed dynamically in order to meet the adequate service level at all times.

20 Claims, 3 Drawing Sheets

(51) Int. Cl.
    *G06Q 50/06*         (2012.01)
    *H04W 74/08*       (2009.01)

(56) References Cited

U.S. PATENT DOCUMENTS

| | | | | |
|---|---|---|---|---|
| 2010/0156632 A1* | 6/2010 | Hyland | ................ | G08B 25/009 340/540 |
| 2011/0284777 A1* | 11/2011 | Pitchford | ............. | F16K 31/084 251/65 |
| 2012/0322440 A1* | 12/2012 | Jeong | ...................... | H04W 4/70 455/425 |
| 2014/0274181 A1* | 9/2014 | Lovegren | ............ | G05B 19/042 455/509 |
| 2015/0259037 A1* | 9/2015 | Eriksen | ................... | B63B 71/00 414/138.1 |
| 2015/0262110 A1* | 9/2015 | Henriques | ................ | H02J 3/00 705/7.14 |
| 2016/0019663 A1* | 1/2016 | Mani | ....................... | H04B 7/15 700/291 |
| 2016/0021613 A1* | 1/2016 | Mani | .................... | H04W 8/005 370/311 |
| 2016/0111039 A1* | 4/2016 | Iwami | ................ | H04N 21/4436 345/520 |
| 2017/0104330 A1* | 4/2017 | Nakaishi | .......... | H02J 13/00028 |
| 2017/0164392 A1* | 6/2017 | Merlin | ............. | H04W 72/1268 |

FOREIGN PATENT DOCUMENTS

| | | | | |
|---|---|---|---|---|
| WO | 2017/065818 | | 4/2017 | |
| WO | WO-2017065818 A1 * | | 4/2017 | ............... H04Q 9/00 |

OTHER PUBLICATIONS

Office Action issued by CIPO for corresponding Chinese Patent Application No. 201810723400.3 dated Dec. 13, 2020.

* cited by examiner

SMART METERING DEVICE PROVIDING ADAPTIVE SERVICE LEVEL

FIELD OF THE INVENTION

The present invention relates to the field of smart metering systems and remote meter reading systems. In particular, the invention provides a solution for dynamic adaption of the performance and Service Level of the meter reading system to meet the need required by the individual smart metering devices in various situations.

BACKGROUND OF THE INVENTION

Automatic meter reading (AMR) systems and advanced meter infrastructure (AMI) systems, in the following commonly referred to as meter reading systems, are generally known in the art. Utility companies use such meter reading systems to read and monitor customer meters remotely, typically using radio frequency (RF) communication. Meter reading systems increase the efficiency and accuracy of collecting readings and managing customer billing.

AMR systems generally uses a mobile RF communication network for collecting meter readings and data, whereas AMI system uses a fixed RF communication network. Especially in AMI systems there may be multiple intermediate collectors located throughout a larger geographic area, each collector in turn communicating with a central back end system, for example by using a wide area network (WAN) or other suitable communication infrastructure. An AMI system may also utilize a system of repeaters or relay devices that expand the coverage area for each reader by forwarding meter readings and data. In a mobile network AMR environment, a handheld, vehicle-mounted, or otherwise mobile reader device with RF communication capabilities is used to collect data from meter devices as the mobile reader is moved from place to place.

A metering system for metering the consumption of a utility may include meter devices in the form of smart meters provided with a communication device for transmitting a RF signal and receiving the RF signal transmitted by other communication devices. The communication devices may be configured to periodically transmit data packets including data representing multiple meter readings and other meter data as a function of time. Such data packets may be processed, transmitted and revised by the receiver device based on a standard signaling protocol, such as the wireless M-BUS protocol.

A meter reading system may further include actuator devices to control the use of a utility. Such actuator devices can be but are not limited to: a valve in a water, gas or district heating utility distribution network or electrical breakers in an electricity utility distribution network. These actuator devices are as well as the meter devices provided with an embedded or external communication device. The communication device provides a communication channel between the back end system/collectors and the actuator devices.

A meter reading system may also include sensors devices that are equipped with a communication device. The communication device provides a communication channel between the back end system/collectors and the sensors. Through the communication channel, the back end system can retrieve data from sensors within the utility distribution network. The sensors may be used for monitoring the quality of the delivered utility or other parameters suitable for optimizing the production of the utility.

Meter devices, actuator devices, sensor devices and other devices may be separate devices but are often integrated into one device containing one or more of the above-mentioned devices. When integrated into one device it may be advantageous if the different devices share central elements like micro controller unit, smart metering application, communication device, power supply unit, battery etc. Such integrated devices are in the following commonly referred to as smart metering devices no matter if the device actually possess a metering device.

Smart metering devices are typically battery-powered, and consequently have a finite amount of energy available for their service cycle. A service cycle for smart metering devices of typically 10-20 years is desirable, to reduce cost associated with meter exchange or battery replacement. Energy conservation is thus a major design criterion. In addition, for smart metering devices having electrical mains available as a power source, energy conservation related to communications is also desirable. As data packet transmission accounts for a substantial portion of the energy usage in smart metering devices, more efficient transmission and reception can have a significant impact on the battery lifetime of a smart metering device. Thus, if the power used for transmission of data packets can be reduced, this will have a positive effect on the total power budget of the smart metering device. However, the transmission power used for communication purposes is often closely related to transmission quality and reception reliability.

The purpose of the communication device is to establish the first step in a physical communication channel between the back end system and a smart metering device e.g. a meter, actuator, sensor or other devices in the meter-reading network. Communication between devices in the metering system will be performed in accordance with a communication protocol. The communication device consists at least of a transmitter and a receiver or only one of the two in case of a one-way system. It is the responsibility of the communication device to handle at least the physical layer of the communication protocol.

A communication device will provide a specific "Service Level". The Service Level may be a measure of one or more of the following: risk of data packet loss, expected latency of establishing a two-way session, data integrity, data throughput or other descriptors of the Service Level. The Service Level will depend on a number of parameters; some can easily be controlled while others are non-controllable by the communication device. Examples of controllable parameters are; transmission power, transmission interval, channel bandwidth, data rate etc. Examples of non-controllable parameters are; risk of data packet loss, congestion in the channel, third party interference etc.

Increasing the Service Level will in most situations increase energy consumption e.g. if transmission power is increased, Tx interval is lowered, data rate is decreased etc. Other consequences of increasing the Service Level might be increased channel occupation, which will lead to a decreased Service Level for other communication device in the network. Since energy and channel bandwidth are limited resources an unneeded general increase in Service Level is disadvantageous.

Furthermore duty cycle limitations and transmission power limitations in the used bands often prohibit a general increase of transmission power or channel usage due to decreased data rate or transmission interval.

AMI systems for battery supplied smart metering devices in general provide a constant low Service Level in order to minimize energy consumption. The communication devices of the AMI systems are configured to provide a Service Level acceptable for the main application while still maintaining a low energy consumption that is adequate for battery supplied devices with a lifetime of more than 16 years. While the low Service Level is acceptable for most applications, e.g. data collection there will be specific critical situations in which a higher Service Level is required. These special critical situations are only present in a time limited period and maintaining the high Service Level required in these situations throughout the entire lifetime of the smart metering device will be extremely energy consuming. The critical situations is often unpredictable and can thus not be foreseen.

Meter reading systems providing a preconfigured Service Level is well known. It is also known to change the Service Level according to a time schedule but these approaches does not adapt Service Level to unforeseen critical situations. The situation in which a consumer is remotely disconnected from a utility e.g. due to missing payment, is especially considered a critical situation. Disconnection of vital supplies like drinking water or district heating etc. are considered highly critical and the ability to reconnect the consumer immediately is thus essential.

Hence, an improved way of controlling Service Level will be advantageous, and in particular an energy conserving and duty cycle efficient regulating mechanism will be advantageous.

Especially providing an adequate Service Level in before mentioned critical but time limited situations without compromising the product/battery lifetime is a need.

OBJECT OF THE INVENTION

In particular, it may be seen as an object of the present invention to provide a smart metering device with a dynamic Service Level adaptable to different and changing situations, such that the above-mentioned problems are minimized while still meeting an adequate Service Level.

SUMMARY OF THE INVENTION

Thus, the above described object and several other objects are intended to be obtained in a first aspect of the invention by providing a smart metering device comprising: a valve arranged to, when being in a first mode, limit the delivery of a utility, when being in a second mode, not limit the delivery of the utility; a communication device comprising a transmitter and a receiver for wireless communication with a collector, utilizing a listen after talk (LAT) mechanism for establishing a two-way session by opening a reception window after transmission of a data frame; a battery for energy supply at least to the communication device; the smart metering device being arranged to autonomously transmit data frames with a configured transmission interval, the smart metering device is further arranged to continuously determine its present state to be critical or non-critical, wherein at least the mode of the valve is a parameter for distinguishing between critical states and non-critical states, the smart metering device is further arranged to change the transmission interval according to the present state, to be shorter when the state is critical than when the state is non-critical, causing a shorter expected latency of initiating a two-way communication session with the smart metering device when in a critical state.

The invention is particularly, but not exclusively, advantageous for obtaining an adequate service level for a smart metering device being exposed to various critical and non-critical situations. The total number of critical and non-critical states of the smart metering device is at least two but could be several critical and non-critical states requiring different service levels. A critical state is merely a state needing a service level different from the standard service level. An important parameter defining service level is the expected latency of establishing a two-way communication session, which in this invention is done by changing communication parameters. Especially the transmission interval is a key parameter with a high influence on the expected latency of establishing a two-way session.

Further, the smart metering device might be configured to, in addition to changing the transmission interval, changing at least one of: transmission power; coding rate; data rate; modulation; center frequency according to being in a critical or non-critical state. One or more of the mentioned communication parameters might be changed when changing between service levels adequate for critical and non-critical states. By changing modulation is understood changing between modulation types as well as modulation index. Other means might be used to increase service level. Service level might be increased by enabling additional layers in the communication protocol e.g. a transport layer. Service level might also be increased by enabling additional coding or spreading e.g. Forward Error Correction (FEC) or Direct Sequence Spread Spectrum (DSSS) or Frequency Hopping Spread Spectrum (FHSS).

The state of the smart metering device shall be understood as an overall state determined by a number of internal and external parameters. A closed valve might in one situation be enough to cause the meter to be in a critical state while in another situation, other parameters might overrule the closed valve and the smart metering device will be in a non-critical state despite the closed valve.

Especially time is an example of such an overruling parameter. In one embodiment, the smart metering device is arranged to change the present state from a critical state to a non-critical state after a predetermined period, in order to limit the maximum time the smart metering device can remain in a critical state. This is advantageous in relation to preserving battery capacity by not supporting a high service level for an extended period. Starting a timer when the critical state is entered and exiting the critical state at timeout will ensure that the high service level only is provide in a short period after a critical event has occurred.

In another embodiment, the smart metering device is further including a metering device for obtaining consumption data, and an internal algorithm for analyzing consumption data, wherein the smart metering device is configured to use the output from the internal algorithm as a parameter for imposing transitions between critical and non-critical states. The algorithm might use flow rates, the consumed amount of utility, peak consumption, minimum consumption, backward flow or other parameters measured by the metering device along with timing information, to detect abnormal user behavior or abnormal usage patterns. Detection and analysis if such abnormal usage patterns might be used to identify e.g. fraud or errors in the installation like leakage of the utility which all are events that might impose transitions to a critical state.

Moreover, the smart metering device might be capable of receiving a command from the collector, during a two-way communication session, in which the smart metering device is requested to change the mode of the valve. The changed mode of the valve might impose a transition between critical and non-critical states in the smart metering device. Especially after receiving a request to close the valve the smart metering device might make a transition to a critical state and provide an expected latency of establishing a two-way communication session that is shorter than prior to closing the valve.

In another embodiment, the smart metering device is further including a sensor device capable of measuring temperature, wherein the smart metering device will use the measured temperature as a parameter for imposing transitions between critical and non-critical states. One or more temperature sensors might measure the temperature of the utility delivered to the consumer, the ambient temperature or the internal temperature of the smart metering device. Especially detecting the risk of water freezing in a water meter or water installation is advantageous.

Other sensors might be integrated in the smart metering device e.g. a sensor device capable of detecting pollution of water, wherein the smart metering device will use the output from the sensor device as a parameter for imposing transitions between critical and non-critical states. A pollution sensor could detect different types of chemical pollution, exceeding acceptable limits, in the utility or leftover chemical substances from production or purification of the utility.

In an alternative embodiment, the smart metering device is further including a turbidity sensor, wherein the smart metering device will use the output from the turbidity sensor as a parameter for imposing transitions between critical and non-critical states.

In yet another alternative embodiment the smart metering device further includes a pressure sensor, wherein the smart metering device will use the output from the pressure sensor as a parameter for imposing transitions between critical and non-critical states.

Especially output from sensors might impose a state change to a critical state in which the adequate service level require the smart metering device, being configured to, in addition to changing the transmission interval, changing the data content of autonomously transmitted data frames according to said state. A change of data content might include a change in data amount. The transmitted data amount might be significantly increased in some critical states. Especially in the case of sensors detecting an abnormal situation, it might be advantageous to add data obtained by the sensor in the data packets.

DETAILED DESCRIPTION OF AN EMBODIMENT

Figure 1:
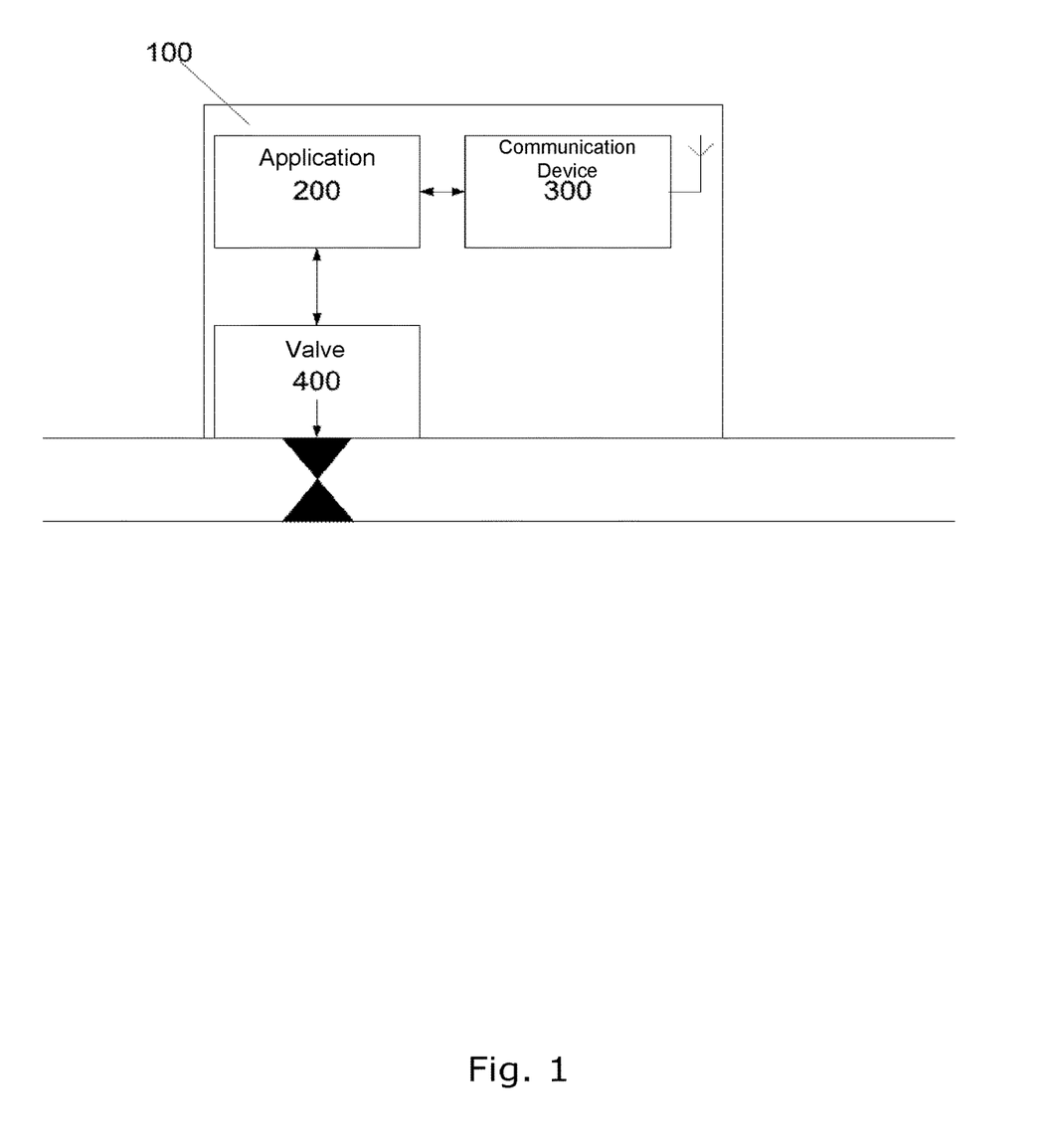
FIG. 1 shows a block diagram of a smart metering device including a smart metering application, a communication device and a actuator controlled valve.

FIG. 1 shows a battery supplied smart metering device 100 designed to control a valve 400 that can be used to disconnect a consumer from a supplied utility. The smart metering device 100 comprising of a communication device 300, a smart metering application 200 and an actuator device in form of a valve 400 arranged for disconnecting the consumer from the supplied utility or limit the amount of the utility delivered to the consumer. The valve 400 is constructed to operate in different modes. For each different mode of operating the valve 400, the delivery of the utility will be limited or not limited by opening the valve 400, closing the valve 400, partly closing the valve 400 or by closing the valve 400 when a preconfigured amount of the utility has been delivered to the consumer within a preconfigured timespan.

The smart metering device 100 communicates with a back end system through a collector utilizing an Advanced Metering Infrastructure (AMI). The AMI can provide various Service Levels providing different levels of communication latency and reliability. The smart metering device 100 is configured to autonomously select different Service Levels for critical and non-critical situations. In this way, the smart metering device 100 will make sure that the adequate Service Level is met in a wide range of situations in a dynamic environment.

The smart metering device 100 will continuously evaluate the current situation to be a critical situation or a non-critical situation and the smart metering device 100 will accordingly be put in a critical state or a non-critical state. A critical situation is a situation, in which a specific critical event has happened, is suspected to have happened or is expected to happen. Closure of the valve 400 is a critical event. Other examples of critical events are: detection of a leak, temperature crossing predefined limits, detection of pollution of the utility, pressure drop, water freezing in a water meter. In a critical situation there is a need for reliable communication with short delay i.e. the required Service Level is higher in a critical situation than in a non-critical situation.

Figure 3:
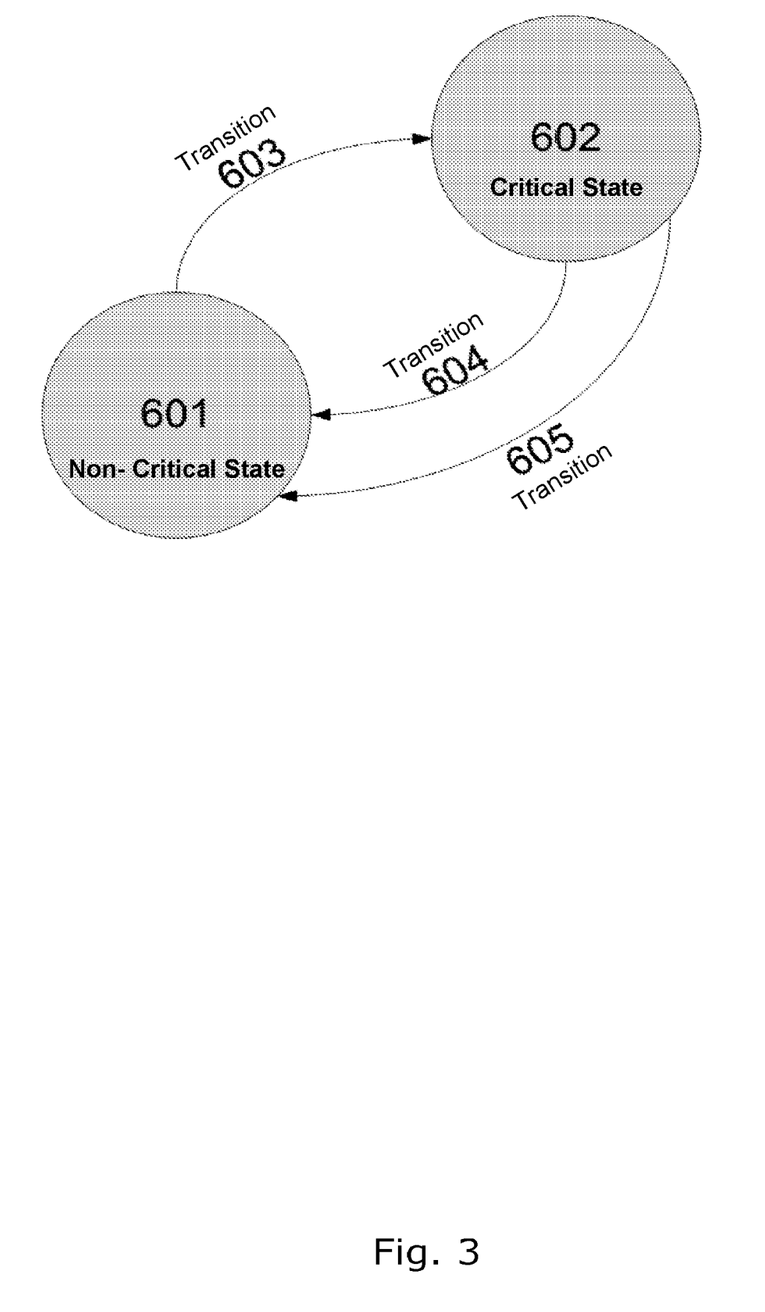
FIG. 3 shows a statemachine for differentiating between critical and non-critical situations in a smart metering device.

The algorithm evaluating the current situation can be implemented as a state machine or by other SW methods. FIG. 3 shows a state machine for evaluating a situation as critical or non-critical. As a result of this evaluation the smart metering device 100 will be in a "Critical State" 602 or "non-Critical State" 601. Transitions 603, 604, 605 between states 601, 602 are imposed by specific events configured to trigger the various transitions 603, 604, 605. 601 is the non-Critical State in which the valve 400 is open. 602 is the Critical State in which the valve 400 is closed. 603 is the transition imposed by the valve 400 closing and 604 is the transition imposed by the valve 400 opening.

The state machine will monitor specific events configured to impose transitions from the current state to another state. When in the non-Critical State 601 the state machine will monitor the event that the valve 400 is closed. When this event occurs a transition to the "Critical state" 602 will be triggered. When in the Critical State 602 the state machine will monitor events triggering a transition to another state 604, 605. If the valve 400 is reopened, a transition 604 to the non-Critical State 601 is triggered. Another event that can trigger an equivalent transition 605 is a timeout, if the smart metering device 100 has been in the critical state 602 for an extended period. More than one event can thus cause a transition between the two same states. Even though the state machine is shown with only two states and three events causing transitions between the states it should be understood that the state machine can be extended with several critical and non-critical states and numerous different events causing transitions between the states. The communication device 300 is configured to provide different Service Levels for the different critical and non-critical states of the smart metering device 100.

Input parameters for the algorithm deciding if the smart metering device 100 is in a critical or non-critical state is at least the state of the valve 400. Other parameters can be used as input to the algorithm as well e.g. the time the valve 400 has remained in a specific state, output from algorithms analyzing consumption patterns, output from sensors e.g. temperature sensors, pressure sensors or pollution sensors. The smart metering device 100 will be in a critical state when the valve 400 is closed, since a consumer has been disconnected from a vital utility e.g. drinking water or gas for heating and cooking purposes. It is thus critical that it is possible to reconnect the consumer without undue delay; this requires an increased Service Level, which is imposed by the critical state.

The AMI uses a communication protocol for establishing a link between the smart metering device 100 and the collector. The communication protocol is structured in independent layers with specific roles and responsibilities. An example of this is the OSI reference model defined in ISO/IEC 7498-1.

The smart metering application 200 communicates with a peer in the back end system or collector. The smart metering application 200 has the ability to interpret the communication protocol used in the communication channel. The smart metering application 200 has the responsibility to handle the application layer of the communication protocol. It is the responsibility of the smart metering application 200 that the relevant security mechanisms are used to ensure confidentiality of relevant data, authenticity, replay protection etc.

The system uses a Listen After Talk (LAT) approach, which is generally known e.g. in the wireless M-Bus standard EN13757-4. LAT means that a two-way session between the smart metering device 100 and the collector only can be initiated after an autonomously transmission of a data packet. Data packets are autonomously initiated by the smart metering device 100 and transmitted by the communication device 300. The autonomously initiated transmissions will in some cases use data packets that carry data e.g. metering data, alarm messages, data from sensor or actuator devices. In other cases, the data packets will not be data carrying but solely have the purpose of enabling the start of a two-way session, by indicating the presence of one or more listening windows following the autonomously initiated transmission. The non-data carrying data packets will have a shorter duration than the data carrying data packets, making the non-data carrying data packets less energy consuming.

The expected latency of establishing a two-way session is closely related to the transmission interval due to the LAT approach. Furthermore, the risk of packet loss will influence expected latency. Packet loss might occur due to collisions caused by congestion in the communication channel or to errors imposed to the data message in the communication channel. Meter reading systems often operate with a high Packet Error Rate (PER). PER in the range 10-50% is common. The expected latency can be minimized by decreasing the transmission interval, increasing the number of listening windows opened after each transmission or changing other communication parameters in order reduce the PER.

PER can be reduced by changing communication parameters to use a narrower band communication channel, by selecting a lower data rate or by changing to a less occupied communication channel by changing the center frequency. Furthermore, PER can be reduced by increasing Forward Error Correction (FEC) coding rate. Alternatively, PER can be reduced by increasing transmission power or increasing spreading rate in a system using spread spectrum. If a large reduction of PER is needed more of the above-mentioned parameters can be changed in combination or other methods of increasing robustness can be used.

In some cases, two-way communication is done by exchanging one or very few data packets in both directions without establishing a session or negotiating session parameters. In other cases, a two-way communication will be starting with negotiation of session parameters. Such session parameter negotiation include one or more of the following activities; initial negotiation of communication parameters; exchange of session encryption keys in order to ensure the required level of privacy, data integrity etc. during the communication session; authentication of the communicating devices; selection of transport layer protocol.

To minimize energy consumption in a battery-supplied device and in general minimize channel occupation, the average transmission interval during the lifetime of the device shall be kept high. An average transmission interval in the range from 5-180 minutes is often required to obtain a sufficient lifetime. The acceptable interval will depend on battery size, transmission power, required product lifetime etc. In some cases, the interval will be higher than 180 minutes. A typical interval could be in the range of 15-120 minutes. When the valve 400 is open, the consumer is connected to the utility, the communication device 300 will use a long transmission interval of e.g. 180 minutes. If the consumer is to be disconnected from the utility, e.g. due to missing payment, a two-way session is established between the smart metering device 100 and the collector. If the smart metering device 100 is in a non-critical state, there will be a latency of up to 180 minutes until the next listening window is opened. If a successful two-way session not is established at the first coming listening window, an additional delay of 180 minutes should be expected. A long latency in relation to disconnecting the consumer is thus to be expected. This Service Level is suitable for the non-critical situation in which the valve 400 is open and the consumer has access to the utility.

When the consumer is to be disconnected from the utility, this is requested through the user interface of the backend system. A request to disconnect the user form the utility is generated and a two-way communications session needs to be established. When the communication session has been successfully established, the communication device 300 of the smart metering device 100 can receive a data packet including a request to close the valve 400. The received data packet is forwarded to the smart metering application 200. The smart metering application 200 will interpret the request and ensure that the required security mechanisms have been utilized, before the valve 400 is closed. As a response to the received request, the smart metering application 200 will generate a response, including information regarding execution of the request and the current mode of the valve 400. The communication device 300 will transmit the generated response embedded in a data frame.

When the valve 400 is closed, and the consumer is disconnected from the utility, the smart metering application 200 will inform the communication device 300 regarding the new critical state of the smart metering device 100. As a response to this change of state, the communication device 300 will start to use communication parameters suitable for the critical state. The change of communication parameters has the purpose of adjusting the Service Level to become adequate for the current critical state. This is done by minimizing the expected latency for establishing a two-way session. In one embodiment, the communication parameter changed is the transmission interval. The transmission interval is for example changed from 180 to 5 minutes. In other cases, the transmission interval might be reduced down to 1 minute. Transmission intervals used may be reduced to between 30 seconds and 60 minutes, depending on the transmission interval used for non-critical states. Reducing the transmission interval to 5 minutes will cause a significantly reduced expected latency of establishing a two-way session. The expected latency for having an opportunity to establishing a two-way session can be calculated as:

$$\text{Expected latency} = \left(\frac{1}{p} - \frac{1}{2}\right)T$$

Where:
p=Packet success rate
T=Transmission interval

If the PER in the channel is 50% a reduction in transmission interval from 180 minutes to 5 minutes will change the expected latency for detecting a listening window and thus having a chance to establish a two way session from 270 minutes to 7.5 minutes. It will thus be possible to reconnect the consumer by establishing a two-way communication session to the communication device 300 and thereby reopening the valve 400 without undue delay. When the valve 400 has reopened, the smart metering device 100 will enter a non-critical state. The communication device 300 will receive information regarding the non-critical state and revert to using the previous communication parameters providing a Service Level suitable for the non-critical state.

The use of communication parameters suitable for critical states will cause a significant increase in average energy consumption. This will, if persisting for a longer period, drain the battery of the device before end of lifetime of the smart metering device 100. To mitigate this problem a mechanism limiting the time the smart metering device 100 remains in a critical state can be implemented. The algorithm deciding the state of the smart metering device 100 will make the smart metering device 100 enter a critical state when the valve 400 is closed. The smart metering device 100 will remain in the critical state in a period right after the valve 400 has been closed. If the valve 400 remains closed for an extended period, a timeout will cause a transition to a non-critical state, even though the valve 400 remains closed. Since the smart metering device 100 is no longer in a critical state, the communication device 300 will revert to using communication parameters suited for a non-critical state. The smart metering device 100 will not enter the critical state again before the valve 400 has been reopened and is closed again. In this embodiment, a period of more than 72 hours is considered an extended period. The limit for entering an extended period is depending on the supplied utility and the Service Level Agreement (SLA) with the consumer. The limit of entering an extended period can be in the range from 8 hours to 31 days. The total increased energy consumption over a lifetime of 16-20 years will only be minimal influenced by a temporary change of communication parameters if the critical situation has a limited time span. The lifetime of the product will thus not be reduced significantly.

The smart metering device 100 can be configured to use a number of different sets of data communication parameters. Different sets of communication parameters provides different Service Levels and are thus appropriate for different types of critical states. The smart metering device 100 may select among different sets of communication parameters, according to the nature or severity of the critical state and the required Service Level. The different sets of communication parameters may be remotely upgradeable and stored in non-volatile memory or hard coded as a part of the firmware in the smart metering device 100.

Figure 2:
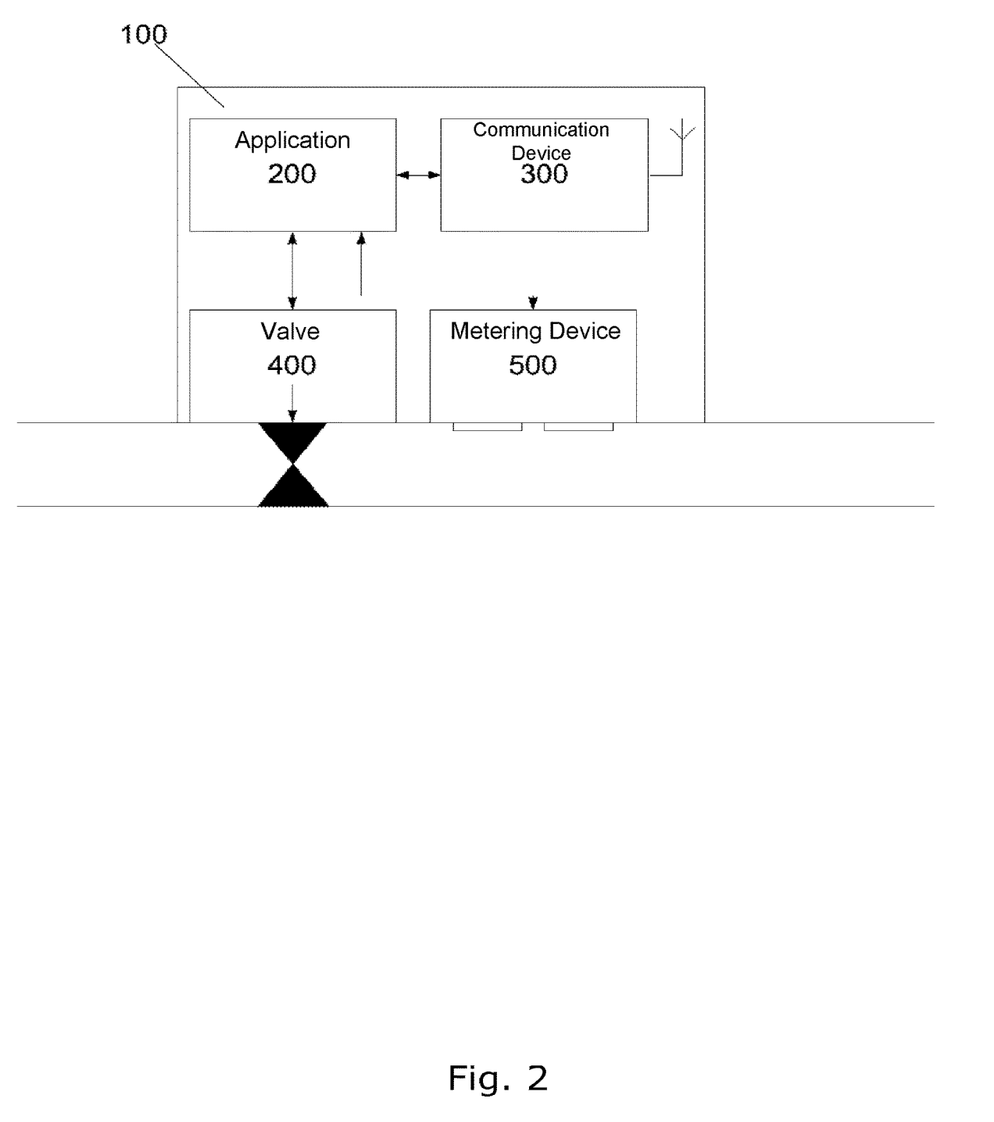
FIG. 2 shows a block diagram of a smart metering device including a smart metering application, a communication device, a actuator controlled valve and a metering device for measuring volume flow.

In another embodiment, analysis of consumption data will be used as input parameters to the algorithm deciding the state of the smart metering device 100 to be critical or non-critical. FIG. 2 shows a smart metering device 100 designed to measure the usage of a supplied utility, support remote reading of usage data, monitor and detect abnormal user behavior and to control a valve 400 that can be used to disconnect the consumer from the utility. The smart metering device 100 consists of a communication device 300, a smart metering application 200, a metering device 500 and an actuator device in form of a valve 400 arranged for disconnecting the consumer from the utility.

The metering device 500 will meter the consumption of the utility. An internal algorithm of the smart metering device 100 will analyze the consumption data to detect abnormal usage patterns. The internal algorithm will e.g. be able to detect a leakage of the utility due to a broken pipe in the supply line after the smart metering device 100, by analyzing consumption data. It is well known in the field to analyze consumption data to detect abnormal situations like small or large leaks e.g. due to corrosion of a pipe or a defect tap. A broken pipe causing a large leakage of the utility will cause a transition of the smart metering device 100 into a critical state. As a response to entering the critical state, the smart meter application 200 will close the valve 400 in order to minimize damage due to a potential leakage of the utility.

As a response to the smart metering device 100 is entering a critical state, primarily due to the detected leak and secondarily due to the closed valve 400, the communication device 300 changes Service Level in order to reduce expected latency for providing a two-way session to the back end system without undue delay. In the case, that the detection of a broken pipe was a false positive leak detection due to abnormal but intentional behavior by the consumer a request may be sent to the smart metering device 100 to reconnect the consumer to the utility by reopening the valve 400 without undue delay.

In yet another embodiment other communication parameters than the transmission interval will be changed when the smart metering device 100 is in a critical state. In this situation, the adequate Service Level will be met by changing the communication channel to a channel reserved for critical situations. Other communication parameters that can be changed to meet an adequate Service Level include; center frequency of a RF channel, data rate, type of modulation, FEC correction algorithms, FEC coding rates, spreading factors, spreading schemes, transmission power and other relevant communication parameters that change the provide Service Level. Different types of spreading could be used e.g. Direct Sequence Spread Spreading (DSSS), or Frequency Hopping Spread Spreading (FHSS).

In yet another embodiment, one or more other sensors, such as temperature sensors, pressure sensors, turbidity sensors, humidity sensors or pollution sensors may be integrated in the smart metering device 100. The sensor provide input data to the algorithm deciding the state of the smart metering device 100 to be critical or non-critical. In some embodiments, output from the sensors is used to impose an event closing or opening the valve 400. In an embodiment where the smart metering device 100 is provided with a temperature sensor, the sensor detects that the temperature approaches 0° C. The algorithm deciding the state of the smart metering device 100 will impose a transmission of the smart metering device 100 into a critical state when analyzing data from the temperature sensor. If the water in the meter and pipes freezes, there is a risk that the installation will break and there will be a water leakage. This situation will require additional data to be delivered to the head end system with a low risk of data loss. This additional data can be used to prevent the installation from freezing e.g. by instructing the consumer to start using water. Thus in the situation where the temperature approaches 0° C. will an increased Service Level is needed. The smart metering device 100 will when in a critical state increase the amount of data sent to the back end system. In addition, the smart metering device might change the content of the data packets when entering a critical state. Furthermore, the smart metering device 100 will increase the FEC coding rate to reduce risk of packet loss. The smart metering device 100 will also start to use a special communication channel reserved for transfer of alarms and other high priority messages from the smart metering device 100 to the back end system. Furthermore, the smart metering device 100 will request the use of a reliable communication strategy by utilizing a transport layer protocol. The transport layer protocol is implemented in a separate layer or a sub-layer of the communication protocol. An example of such a transport layer providing a reliable communication is the TCP layer of the IP stack.

The invention claimed is:

1. A smart metering device comprising:
    a communication device comprising a transmitter and a receiver for wireless communication with a collector, utilizing a listen after talk (LAT) mechanism for establishing a two-way communication session by opening at least one reception window after transmission of a data frame;
    a battery for energy supply at least to the communication device;
    the smart metering device being configured to analyze consumption of a utility as consumption data and to output a result of the analysis of the consumption of the utility as the consumption data, and being arranged to autonomously transmit data frames with a configured transmission interval, the smart metering device is further arranged to continuously determine its present state to be a critical state or a non-critical state, wherein at least the result of the analysis is a parameter for distinguishing between critical states and non-critical states, the smart metering device is further arranged to change the configured transmission interval according to the present state, to be shorter when the present state is the critical state than when the present state is the non-critical state, causing a shorter expected latency of initiating the two-way communication session with the smart metering device when in the critical state.

2. The smart metering device of claim 1, wherein the analysis of the consumption of the utility as the consumption data is configured to detect abnormal usage of the utility.

3. The smart metering device of claim 1, wherein the consumption of the utility as the consumption data includes at least one of flow rates of the utility, total consumption of the utility, peak consumption of the utility, minimum consumption of the utility, or backward flow of the utility.

4. The smart metering device according to claim 1, wherein the smart metering device is arranged to change the present state from the critical state to the non-critical state after a predetermined period, in order to limit a maximum time the smart metering device can remain in the critical state.

5. The smart metering device according to claim 1, further including a metering device for obtaining the consumption data, and an internal algorithm for analyzing the consumption data, wherein the smart metering device is configured to use an output from the internal algorithm as a parameter for imposing transitions between the critical states and the non-critical states.

6. The smart metering device according to claim 1, wherein the smart metering device is further configured to change at least one of: transmission power; coding rate; data rate; modulation; or center frequency, according to the present state.

7. The smart metering device according to claim 1, wherein the smart metering device is adapted to receive a command from the collector, during the two-way communication session, in which the smart metering device is requested to change a current mode of a valve to a different mode of operating the valve.

8. The smart metering device according to claim 1, further including a sensor device adapted to measure temperature, wherein the smart metering device is adapted to use the measured temperature as a parameter for imposing transitions between the critical states and the non-critical states.

9. The smart metering device according to claim 1, further including a sensor device adapted to detect pollution of water, wherein the smart metering device is adapted to use an output from the sensor device as a parameter for imposing transitions between the critical states and the non-critical states.

10. The smart metering device according to claim 1, further including a turbidity sensor, wherein the smart metering device is adapted to use an output from the turbidity sensor as a parameter for imposing transitions between the critical states and the non-critical states.

11. The smart metering device according to claim 1, further including a pressure sensor, wherein the smart metering device is adapted to use an output from the pressure sensor as a parameter for imposing transitions between the critical states and the non-critical states.

12. The smart metering device according to claim 1, wherein the smart metering device is further configured to change data content of the autonomously transmitted data frames according to the present state.

13. A smart metering device comprising:
    a sensor device configured to measure a property of a utility being delivered;
    a communication device comprising a transmitter and a receiver for wireless communication with a collector, utilizing a listen after talk (LAT) mechanism for establishing a two-way communication session by opening at least one reception window after transmission of a data frame;
    a battery for energy supply at least to the communication device;
    the smart metering device being arranged to autonomously transmit data frames with a configured transmission interval, the smart metering device is further arranged to continuously determine its present state to be a critical state or a non-critical state, wherein the measured property is a parameter for distinguishing between critical states and non-critical states, the smart metering device is further arranged to change the configured transmission interval according to the present state, to be shorter when the present state is the critical state than when the present state is the non-critical state, causing a shorter expected latency of initiating the two-way communication session with the smart metering device when in the critical state.

14. The smart metering device of claim 13, wherein the sensor device is configured to measure a temperature of the utility delivered to a consumer.

15. The smart metering device of claim 14, wherein the sensor device is further configured to measure at least one of a pressure of the utility, a turbidity of the utility, or a pollution of the utility.

16. The smart metering device according to claim 13, wherein the smart metering device is arranged to change the present state from the critical state to the non-critical state after a predetermined period, in order to limit a maximum time the smart metering device can remain in the critical state.

17. The smart metering device according to claim 13, further including a metering device for obtaining consumption data, and an internal algorithm for analyzing the consumption data, wherein the smart metering device is configured to use an output from the internal algorithm as a parameter for imposing transitions between the critical states and the non-critical states.

18. The smart metering device according to claim 13, wherein the smart metering device is further configured to change at least one of: transmission power; coding rate; data rate; modulation; or center frequency, according to the present state.

19. The smart metering device according to claim 13, wherein the smart metering device is adapted to receive a command from the collector, during the two-way communication session, in which the smart metering device is requested to change a current mode of a valve to a different mode of operating the valve.

20. A smart metering device comprising:
- a valve arranged to, when in a first mode, limit a delivery of a utility and, when in a second mode, not limit the delivery of the utility;
- a communication device having a transmitter and a receiver for wireless communication with a collector, and utilizing a listen after talk (LAT) mechanism for establishing a two-way communication session by opening at least one reception window after transmission of a data frame; and
- a battery arranged to supply energy to the communication device;
- wherein the smart metering device is arranged to autonomously transmit data frames with a configured transmission interval, and to continuously determine its present state to be a critical state or a non-critical state;
- wherein at least a current mode of the valve is a parameter for distinguishing between critical states and non-critical states;
- wherein the smart metering device is further arranged to change the configured transmission interval according to the present state such that the configured transmission interval is shorter when the present state is the critical state than when the present state is the non-critical state, resulting in a shorter expected latency of initiating the two-way communication session with the smart metering device when in the critical state;
- wherein the smart metering device is arranged to change the present state from the critical state to the non-critical state after a predetermined period, in order to limit a maximum time the smart metering device can remain in the critical state; and
- wherein the smart metering device is adapted to receive a command from the collector, during the two-way communication session, in which the smart metering device is requested to change the at least the current mode of the valve to a different mode of operating the valve.

* * * * *